United States Patent
Kwak et al.

(10) Patent No.: US 10,932,241 B2
(45) Date of Patent: Feb. 23, 2021

(54) METHOD FOR UPLINK TRANSMISSION IN WIRELESS COMMUNICATION SYSTEM, AND APPARATUS THEREFOR

(71) Applicant: LG Electronics Inc., Seoul (KR)

(72) Inventors: Kyuhwan Kwak, Seoul (KR); Daesung Hwang, Seoul (KR); Hyunho Lee, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/346,797

(22) PCT Filed: Nov. 2, 2017

(86) PCT No.: PCT/KR2017/012353
§ 371 (c)(1),
(2) Date: May 1, 2019

(87) PCT Pub. No.: WO2018/084611
PCT Pub. Date: May 11, 2018

(65) Prior Publication Data

US 2020/0077382 A1 Mar. 5, 2020

Related U.S. Application Data

(60) Provisional application No. 62/417,304, filed on Nov. 3, 2016.

(51) Int. Cl.
*H04W 72/04* (2009.01)
*H04L 1/16* (2006.01)
*H04L 1/18* (2006.01)

(52) U.S. Cl.
CPC ....... *H04W 72/0413* (2013.01); *H04L 1/1671* (2013.01); *H04L 1/1812* (2013.01); *H04W 72/0446* (2013.01)

(58) Field of Classification Search
CPC .................... H04W 72/0413; H04W 72/0446
(Continued)

(56) References Cited

U.S. PATENT DOCUMENTS

2013/0238954 A1 9/2013 Jang et al.
2014/0003452 A1* 1/2014 Han ................ H04L 1/1657
370/474

(Continued)

FOREIGN PATENT DOCUMENTS

WO 2011108822 A2 9/2011
WO 2015200667 A1 12/2015

OTHER PUBLICATIONS

Catt, 'sPUCCH design for sTTI', R1-1608750, 3GPP TSG RAN WG1 Meeting #86bis, Gothenburg, Sweden, Oct. 1, 2016.

*Primary Examiner* — Huy D Vu
*Assistant Examiner* — Nizam U Ahmed
(74) *Attorney, Agent, or Firm* — Dentons US LLP

(57) ABSTRACT

Disclosed are a method for uplink transmission in a wireless communication system, and an apparatus therefor. Specifically, a method by which a terminal performs an uplink transmission using tail biting convolution coding (TBCC) in a wireless communication system comprises the steps of: encoding a coded bit using a plurality of bits; and transmitting the coded bit, which has been encoded, to a base station using an uplink control channel, wherein the plurality of bits are generated by repeating odd number of times at least one bit corresponding to uplink control information, and the number of the plurality of bits may be set to be equal to or larger than a predetermined threshold for the TBCC.

15 Claims, 10 Drawing Sheets

(58) Field of Classification Search
USPC .......................................................... 370/336
See application file for complete search history.

(56) References Cited

U.S. PATENT DOCUMENTS

2016/0013917 A1   1/2016 Han et al.
2018/0145796 A1*  5/2018 Liang ................... H04L 1/1861
2018/0227958 A1*  8/2018 Xiong ............... H04W 74/0833

* cited by examiner

D : Shift register

US 10,932,241 B2

METHOD FOR UPLINK TRANSMISSION IN WIRELESS COMMUNICATION SYSTEM, AND APPARATUS THEREFOR

CROSS-REFERENCE TO RELATED APPLICATION

This application is the National Stage filing under 35 U.S.C. 371 of International Application No. PCT/KR2017/012353, filed on Nov. 2, 2017, which claims the benefit of U.S. Provisional Application No. 62/417,304, filed on Nov. 3, 2016. The contents of which are all hereby incorporated by reference herein in their entirety.

TECHNICAL FIELD

The present invention relates to a wireless communication system and, more particularly, to a method of performing uplink transmission by a user equipment and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

This specification proposes a method of performing uplink transmission by a user equipment in a wireless communication system.

In relation to this, this specification proposes a method of transmitting uplink control information of a small size through a container of a large size.

Specifically, this specification proposes method of performing channel coding by applying a Reed-Muller coding scheme to uplink control information.

Furthermore, this specification proposes a method of performing TBCC-based channel coding by adding a pre-configured bit(s) to uplink control information.

Furthermore, this specification proposes a method of performing TBCC-based channel coding by repeating a bit(s) corresponding to uplink control information.

Technical objects to be achieved by the present invention are not limited to the aforementioned technical objects, and other technical objects not described above may be evidently understood by a person having ordinary skill in the art to which the present invention pertains from the following description.

Technical Solution

A method of performing uplink transmission by a user equipment using tail biting convolution coding (TBCC) in a wireless communication system according to an embodiment of the present invention includes encoding a coded bit using a plurality of bits and transmitting, to a base station, the encoded coded bit through an uplink control channel. The plurality of bits is generated by repeating at least one bit, corresponding to uplink control information, by an odd number of times. The bit number of the plurality of bits is configured to be equal to or greater than a pre-configured threshold value for the TBCC.

Furthermore, in the method according to an embodiment of the present invention, the uplink control channel may be configured based on a short transmission time interval.

Furthermore, the method according to an embodiment of the present invention further includes receiving downlink data from the base station. The uplink control information may include HARQ-ACK information for the received downlink data.

Furthermore, in the method according to an embodiment of the present invention, the HARQ-ACK information may be configured in a bitmap form of 1 bit or 2 bits.

Furthermore, the method according to an embodiment of the present invention further includes receiving a plurality of downlink data from a plurality of base stations including the base station. The uplink control information may include multiple HARQ-ACK information for the plurality of downlink data.

Furthermore, in the method according to an embodiment of the present invention, the multiple HARQ-ACK information may be configured as a smaller number of bits than the pre-configured threshold value.

Furthermore, in the method according to an embodiment of the present invention, the multiple HARQ-ACK information may be configured based on at least one of ACK/NACK multiplexing or ACK/NACK bundling.

Furthermore, in the method according to an embodiment of the present invention, the pre-configured threshold value may be configured based on the number of shift registers included in an encoder for the TBCC.

Furthermore, in the method according to an embodiment of the present invention, the pre-configured threshold value may be configured as a value obtained by adding 1 to the number of shift registers.

A user equipment performing uplink transmission using tail biting convolution coding (TBCC) in a wireless communication system according to an embodiment of the present invention includes a radio frequency (RF) unit configured to transmit and receive radio signals, and a processor functionally connected to the RF unit. The processor may be configured to encode a coded bit using a plurality of bits and to transmit, to a base station, the encoded coded bit through an uplink control channel. The plurality of bits may be generated by repeating at least one bit, corresponding to uplink control information, by an odd number of times. The bit number of the plurality of bits may be configured to be equal to or greater than a pre-configured threshold value for the TBCC.

Furthermore, in the user equipment according to an embodiment of the present invention, the uplink control channel may be configured based on a short transmission time interval.

Furthermore, in the user equipment according to an embodiment of the present invention, the processor is configured to receive downlink data from the base station, and the uplink control information may include HARQ-ACK information for the received downlink data.

Furthermore, in the user equipment according to an embodiment of the present invention, the HARQ-ACK information may be configured in a bitmap form of 1 bit or 2 bits.

Furthermore, in the user equipment according to an embodiment of the present invention, the processor is configured to receive a plurality of downlink data from a plurality of base stations including the base station. The uplink control information may include multiple HARQ-ACK information for the plurality of downlink data.

Furthermore, in the user equipment according to an embodiment of the present invention, the pre-configured threshold value may be configured based on the number of shift registers included in an encoder for the TBCC.

Advantageous Effects

According to an embodiment of the present invention, there is an effect in that the complexity of a system is reduced because uplink transmission is performed using the same format regardless of the size of information (or data) to be transmitted by a user equipment.

Furthermore, according to an embodiment of the present invention, there is an effect in that a constraint condition configured for each encoder can be satisfied although a user equipment channel-codes information (e.g., HARQ-ACK information) of a small size.

Furthermore, according to an embodiment of the present invention, there is an effect in that a user equipment can perform robust uplink transmission because information of a small size is transmitted through a container of a large size.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

MODE FOR INVENTION

Figure 1:
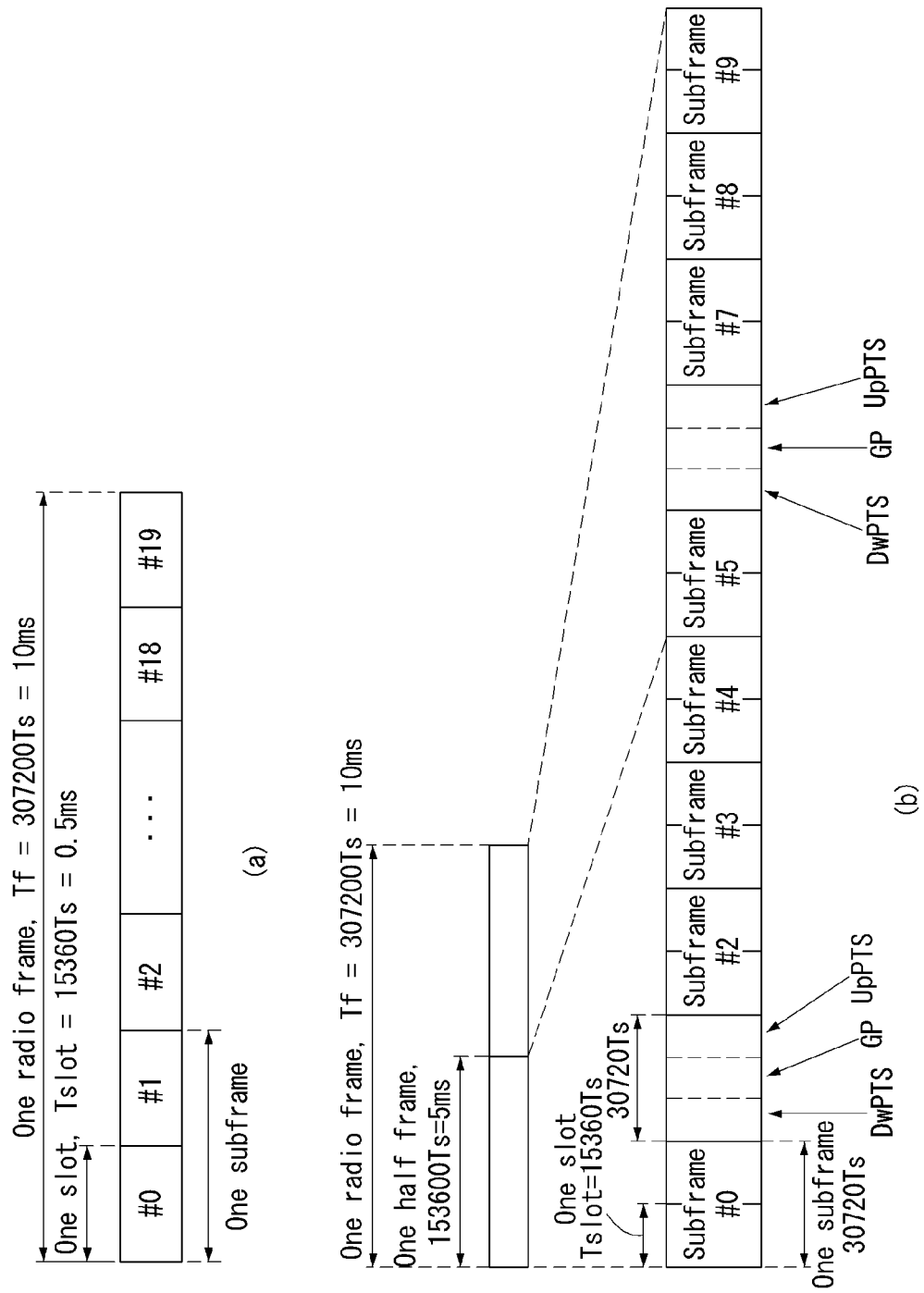
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), a generation NodeB (gNB), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

General LTE System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

Figure 3:
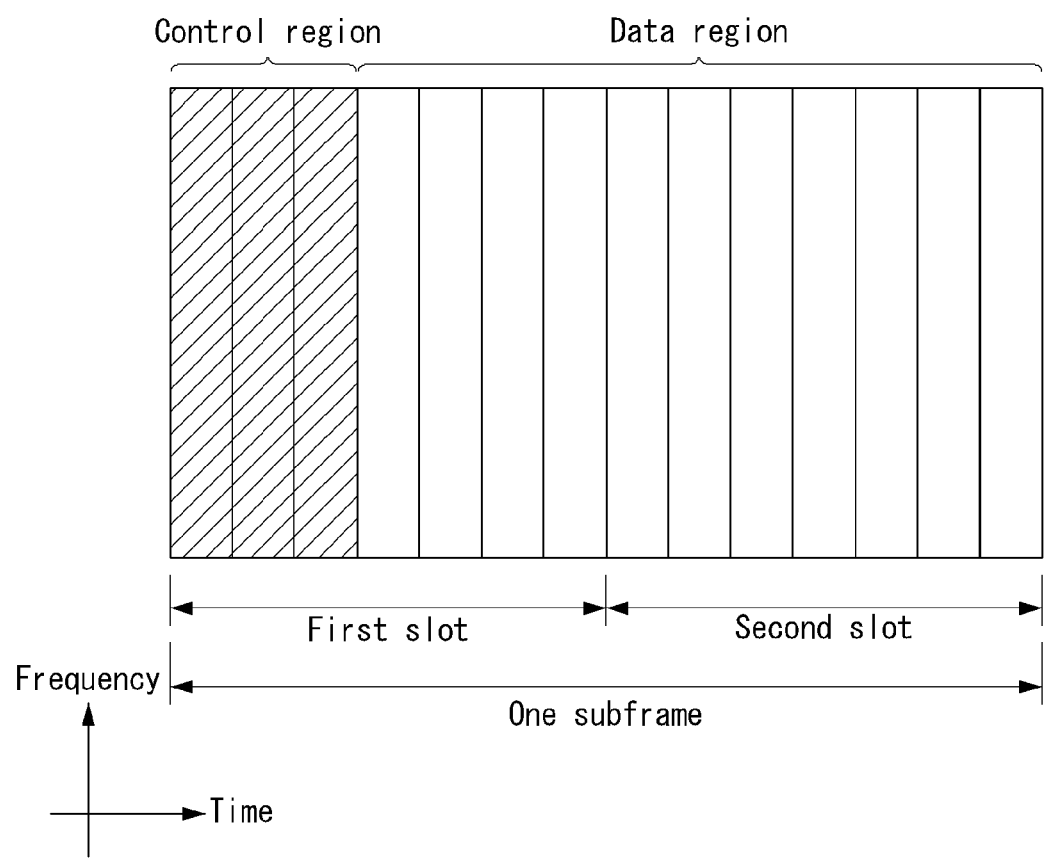
FIG. 3 illustrates the structure of a downlink subframe in a wireless communication system to which the present invention may be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

Figure 2:
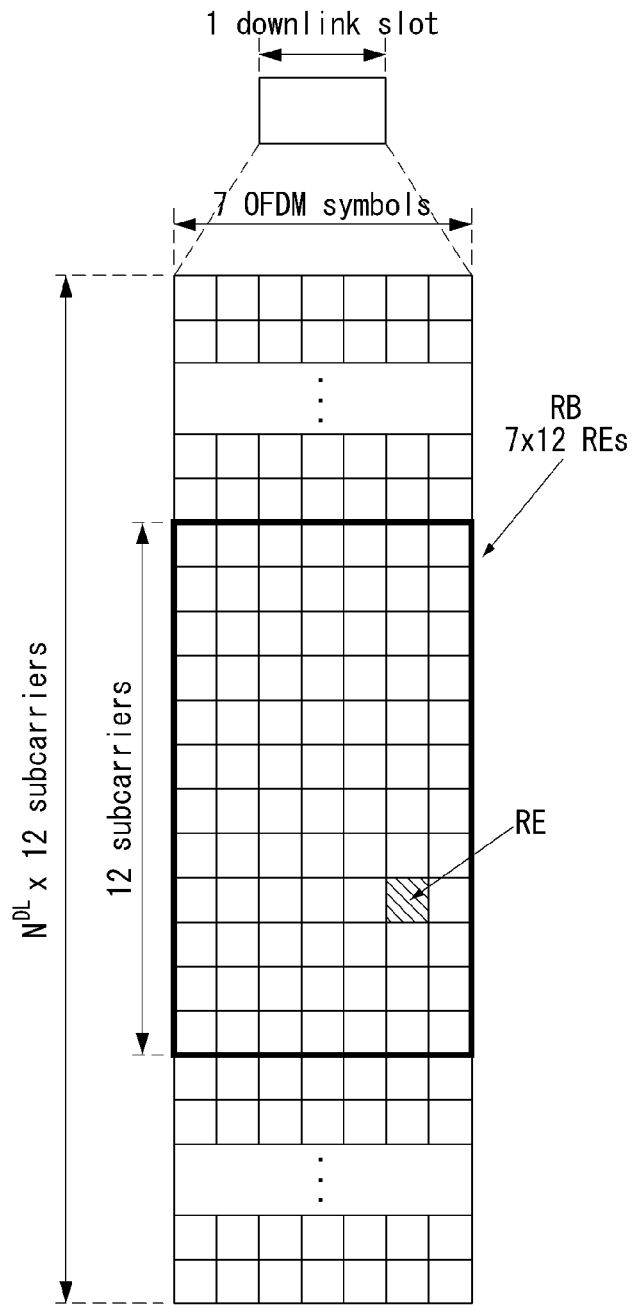
FIG. 2 is a diagram illustrating a resource grid for one downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

Figure 4:
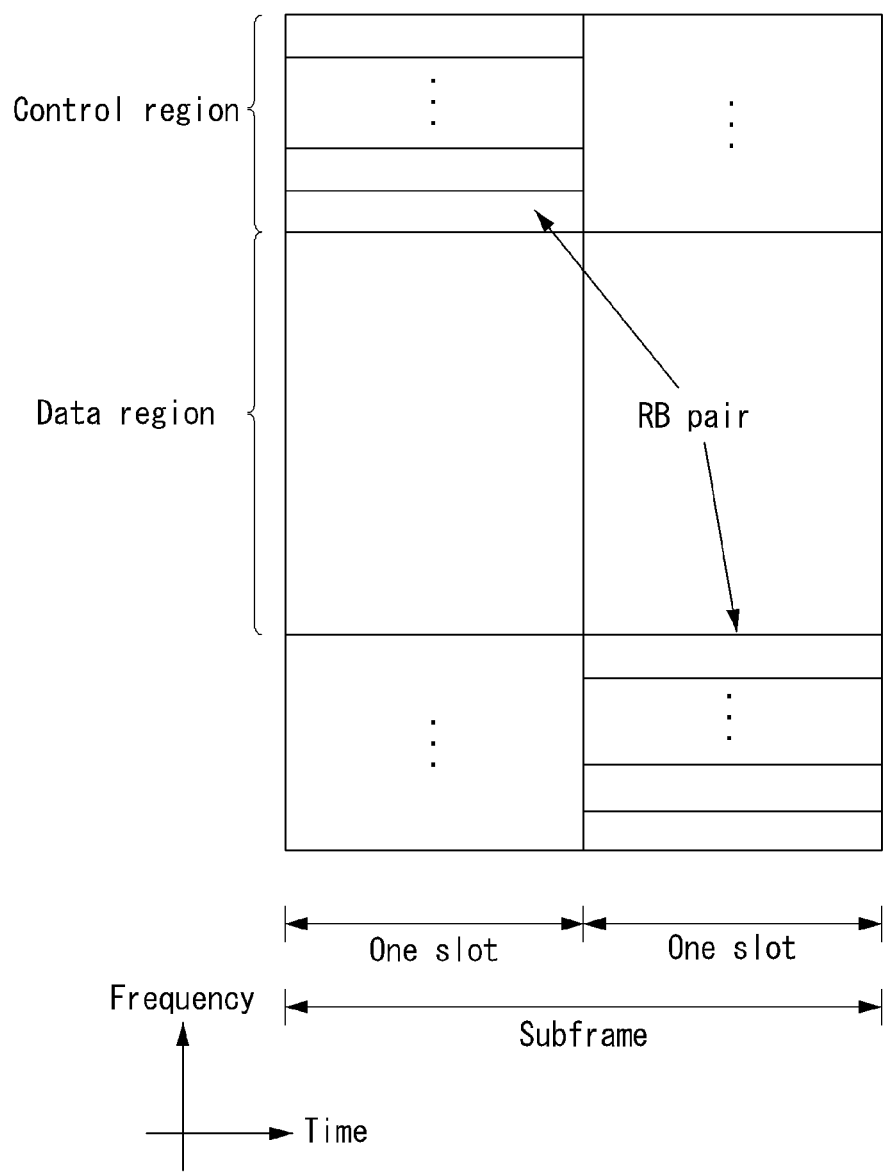
FIG. 4 illustrates the structure of an uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

General NR System

As smartphones and Internet of Things (IoT) terminals spread rapidly, the amount of information exchanged through the communication network is increasing. Accordingly, it is necessary to consider an environment (e.g., enhanced mobile broadband communication) that provides faster service to more users than existing communication systems (or existing radio access technology) in the next generation wireless access technology.

To this end, a design of a communication system considering Machine Type Communication (MTC) that provides services by connecting a plurality of devices and objects is being discussed. In addition, a design of a communication system (for example, Ultra-Reliable and Low Latency Communication (URLLC) considering a service and/or a terminal sensitive to reliability and/or latency of communication is also discussed.

Hereinafter, in the present disclosure, for convenience of explanation, the next generation radio access technology is referred to as NR (New RAT, Radio Access Technology), and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

Figure 5:
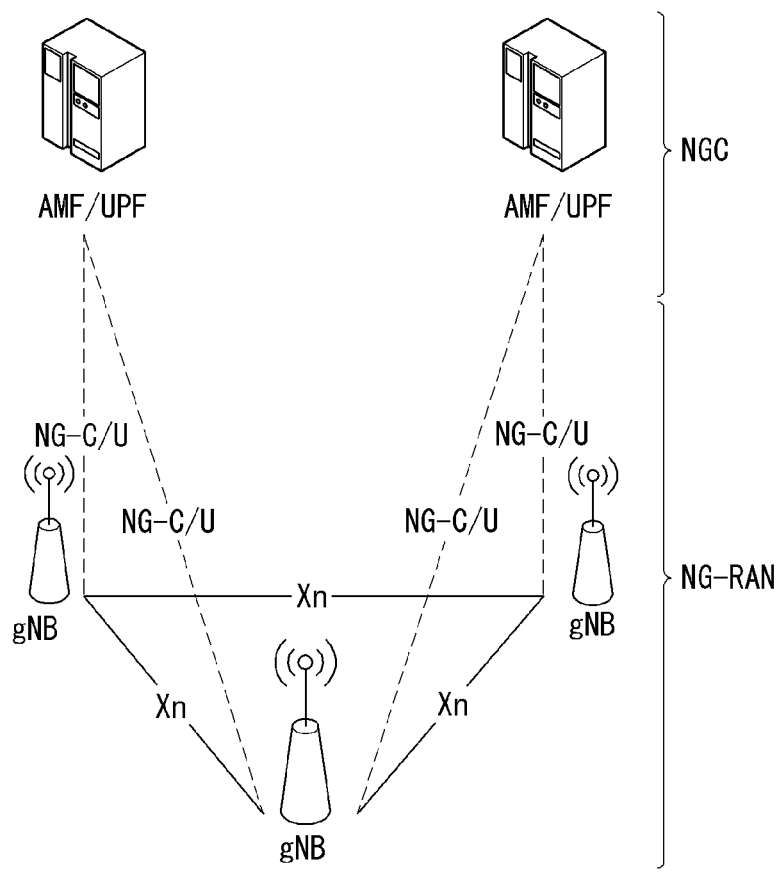
FIG. 5 shows an example of an overall system structure of new RAT (NR) to which a method proposed in this specification may be applied.

FIG. 5 is a diagram illustrating an example of an overall structure of a new radio (NR) system to which a method proposed by the present disclosure may be implemented.

Referring to FIG. 5, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 3.

TABLE 3

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 6:
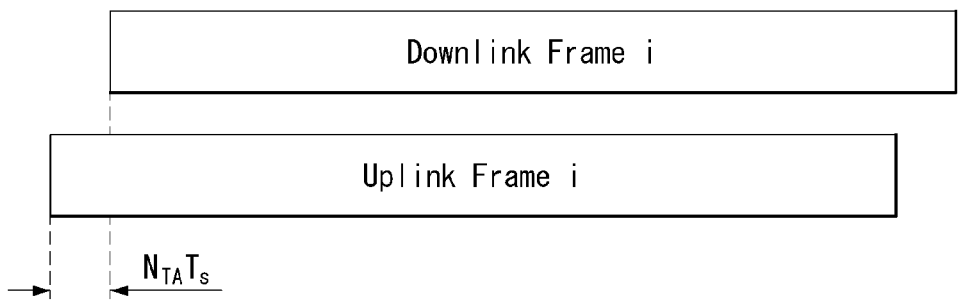
FIG. 6 shows the relation between an uplink frame and a downlink frame in a wireless communication system to which a method proposed in this specification may be applied.

FIG. 6 illustrates a relationship between a UL frame and a DL frame in a wireless communication system to which a method proposed by the present disclosure may be implemented.

As illustrated in FIG. 6, a UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 4 shows the number of OFDM symbols per slot for a normal CP in the numerology μ, and Table 5 shows the number of OFDM symbols per slot for an extended CP in the numerology μ.

TABLE 4

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 5

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 7:
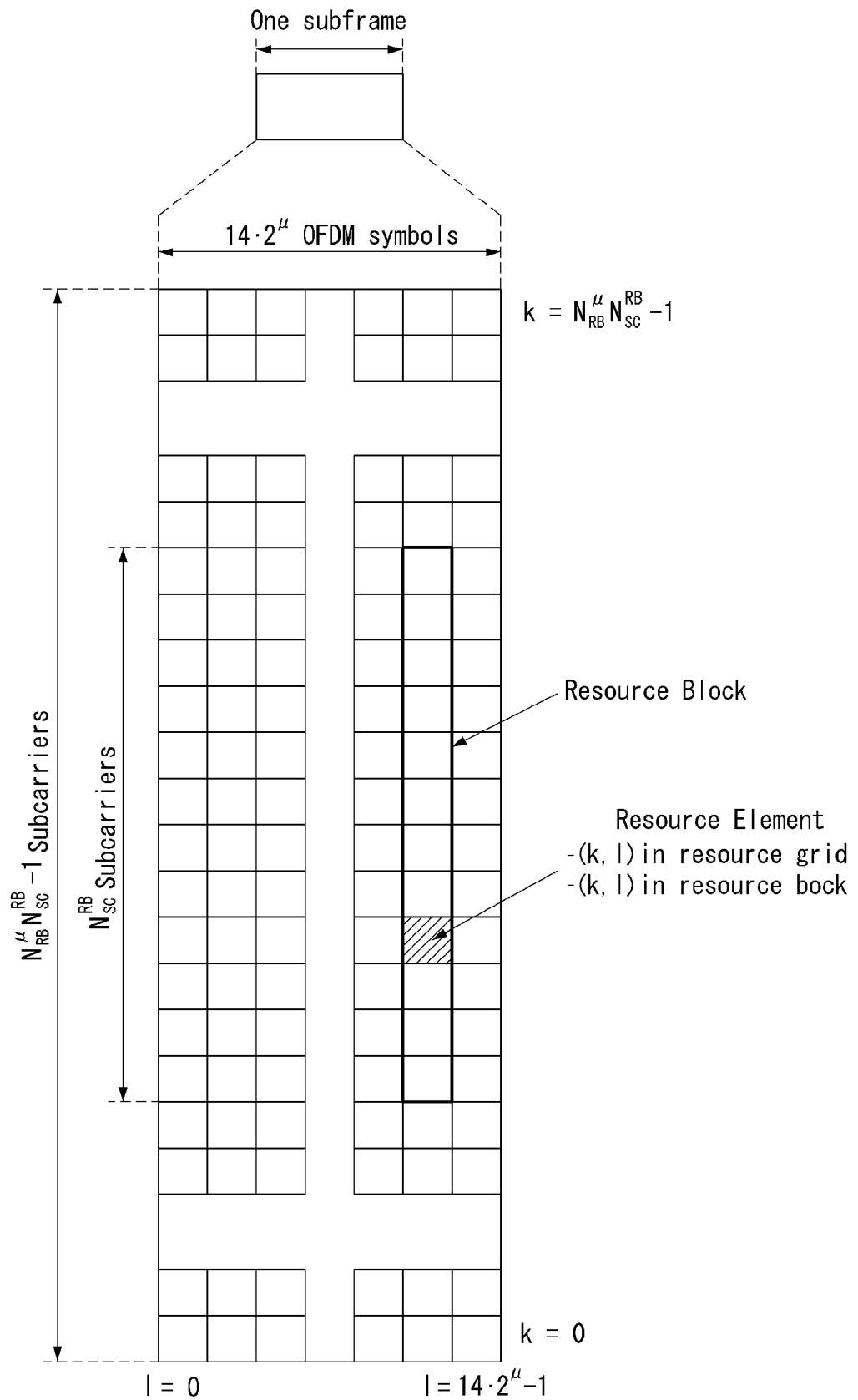
FIG. 7 shows an example of a resource grid supported in a wireless communication system to which a method proposed in this specification may be applied.

FIG. 7 illustrates an example of a resource grid supported in a wireless communication system to which a method proposed by the present disclosure may be implemented.

Referring to FIG. 7, a resource grid is composed of $N_{RB}^\mu N_{sc}^{RB}$ subcarriers in a frequency domain, each subframe composed of 14.2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

Figure 8:
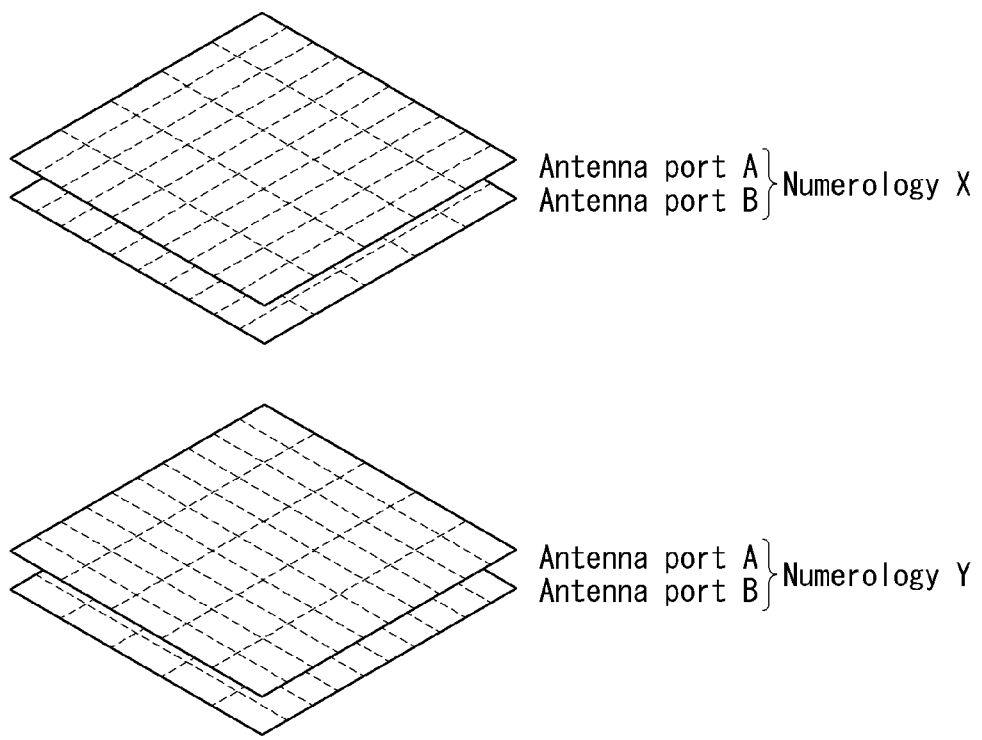
FIG. 8 shows examples of a resource grid for each antenna port and numerology to which a method proposed in this specification may be applied.

In this case, as illustrated in FIG. 8, one resource grid may be configured for the numerology μ and an antenna port p.

FIG. 8 illustrates examples of resource grids for each antenna port and numerology to which a method proposed in this specification may be applied.

Each element of the resource grid for the numerology μ and the antenna port p is indicated as a resource element, and may be uniquely identified by an index pair (k,l). Herein, $k=0, \ldots, N_{RB}^\mu N_{sc}^{RB}-1$ is an index in the frequency domain, and l=0, . . . , $2^\mu N_{symb}^{(\mu)}-1$ indicates a location of a symbol in a subframe. To indicate a resource element in a slot, the index pair (k,l) is used. Herein, l=0, . . . , $N_{symb}^\mu-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^\mu-1$ in the frequency region.

General HARQ Procedures

Figure 9:
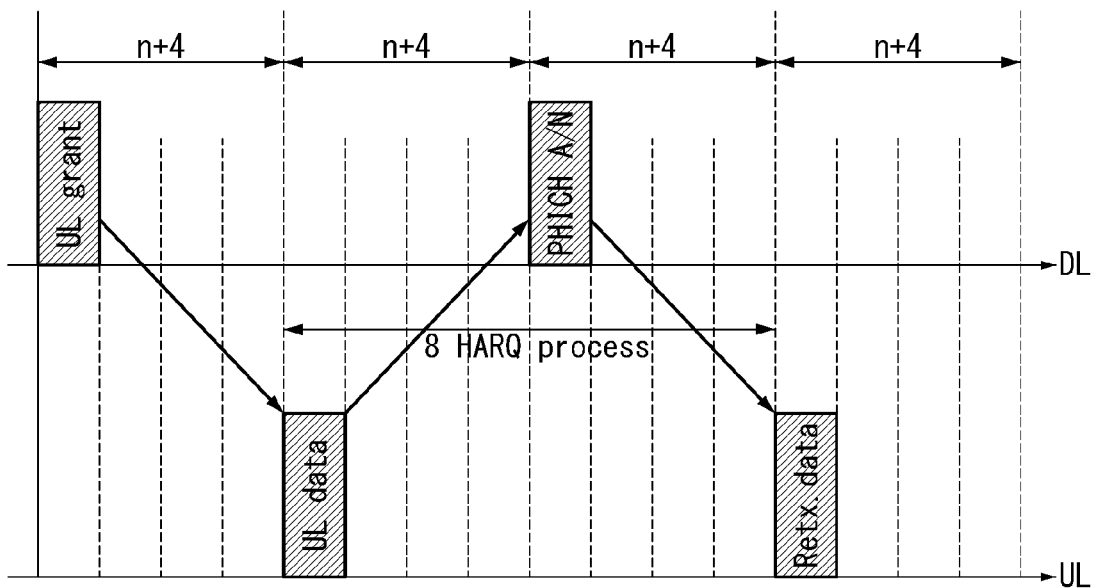
FIG. 9 shows an example of a synchronous HARQ operation in uplink to which a method proposed in this specification may be applied.

FIG. 9 illustrates an example of a synchronous HARQ operation in an uplink to which a method proposed by the present disclosure may be applied.

Referring to FIG. 9, a base station that has transmitted NACK transmits retransmission data to the same resource as initial data transmission by allocating a data resource for retransmission to a new resource configuring an NDI in an UL grant (DCI format 1) as a bit indicating retransmission, or omitting the UL grant. At this time, the retransmission timing is fixed to a subframe after 4 ms after receiving the NACK.

An HARQ scheme basically attempts error correction for a received code and determines whether or not to retransmit using a simple error detection code such as a Cyclic Redundancy Check (CRC). For retransmission, the HARQ scheme is divided into three types as follows, and LTE performs the HARQ scheme through CC (a second scheme) or IR (a third scheme).

1) Type-I HARQ Scheme: A receiving end discards a packet with errors and makes a retransmission request, and a transmitting end transmits the same packet as an initial transmission. This improves reliability of the system and improves performance through FEC by discarding the packet with errors.

2) Type-I HARQ Scheme with Chase Combining: Instead of discarding a packet with errors this is a scheme used to combine it with a retransmitted packet. By combining a plurality of packets as a result, the same effect as increasing the signal power can be obtained.

3) Type-II HARQ Scheme (Incremental redundancy Scheme): In case of Type-I, in order to prevent unnecessarily high redundancy codes from being transmitted during the initial transmission, it is a scheme to use a code with a high coding rate in the initial transmission and transmit additional redundancy when retransmission occurs.

TDD HARQ ACK/NACK Transmission

Hereinafter, ACK/NACK transmission for HARQ in LTE Time Division Duplex (TDD) will be described.

Unlike Frequency Division Duplex (FDD), a downlink subframe and an uplink subframe coexist in one radio frame in TDD. In the TDD frame, the number of uplink subframes may be less than or equal to the number of downlink subframes according to the UL-DL configuration. Accordingly, in case that the uplink subframe for transmitting an ACK/NACK signal (i.e., ACK/NACK information) is insufficient, a method of transmitting downlink transport blocks received in a plurality of downlink subframes or a plurality of ACK/NACK signals for PDSCH in one uplink subframe is supported.

In this case, two ACK/NACK modes such as ACK/NACK bundling and ACK/NACK multiplexing may be considered. The ACK/NACK bundling is a method of transmitting the ACK if a UE succeeds all in decoding of the received PDSCHs (or downlink transport blocks), and otherwise transmitting the NACK. To this end, the ACK or NACK for each PDSCH is compressed through a logical AND operation. The ACK/NACK multiplexing may be referred to as ACK/NACK channel selection (or channel selection). In the ACK/NACK multiplexing, the UE selects one PUCCH resource among a plurality of PUCCH resources to transmit the ACK/NACK.

Table 6 shows a downlink association set K: {k0, k1, . . . kM−1} associated with a downlink subframe n−k associated with an uplink subframe n according to the uplink-downlink configuration. Here, M means the number of elements of the set K.

TABLE 6

| UL/DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

ACK/NACK Multiplexing

In a situation where the UE must simultaneously transmit a plurality of ACK/NACKs corresponding to a plurality of data units received from the base station, in order to maintain a single-frequency characteristic of the ACK/NACK signal, and reduce ACK/NACK transmission power, a method of the ACK/NACK multiplexing based on PUCCH resource selection may be considered.

Along with the ACK/NACK multiplexing, the contents of ACK/NACK responses for the plurality of data units are identified by a combination of the PUCCH resource used for an actual ACK/NACK transmission and resources of QPSK modulation symbols.

For example, if one PUCCH resource transmits 4 bits and 4 data units can be transmitted at a maximum, ACK/NACK results can be identified at the base station as shown in Table 7 below.

TABLE 7

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, CK, ACK | $n_{PUCCH,1}^{(1)}$ | 1, 1 |
| ACK, ACK, ACK, NACK/DTX | $n_{PUCCH,1}^{(1)}$ | 1, 0 |

TABLE 7-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 7, HARQ-ACK(i) indicates an ACK/NACK result for an i-th data unit. In Table 7, Discontinuous Transmission (DTX) means that there is no data unit to be transmitted for corresponding HARQ-ACK(i) or that the UE can not detect a data unit corresponding to the HARQ-ACK (i).

According to Table 7, there are a maximum of 4 PUCCH resources ($n_{PUCCH,0}^{(1)}$, $n_{PUCCH,1}^{(1)}$, $n_{PUCCH,2}^{(1)}$, and $n_{PUCCH,3}^{(1)}$) and b (0), b (1) are 2 bits to be transmitted using the selected PUCCH. For example, if the UE successfully receives all 4 data units, the UE transmits 2 bits (1,1) using $n_{PUCCH,1}^{(1)}$. If the UE fails in decoding in first and third data units and succeeds in decoding in second and fourth data units, the UE transmits a bit (1,0) using $n_{PUCCH,3}^{(1)}$.

In the ACK/NACK channel selection, if there is at least one ACK, NACK and DTX are coupled. This is because a combination of reserved PUCCH resources and QPSK symbols can not represent all ACK/NACK states. However, if there is no ACK, the DTX is decoupled from the NACK.

In a next generation communication system, a structure in which a transmission time interval (TTI) is configured to be short may be considered in order to reduce a delay time that may occur when information is transmitted or received. In addition, in the next generation communication system, a method of transmitting similar information (for example, HARQ ACK/NACK bits, etc.) through a channel (for example, a long PUCCH, a short PUCCH, etc.) having a different length may be considered in consideration of different coverage. Here, the next generation communication system may mean an enhanced LTE system or an NR system or the like.

In this case, the size of a container used for the transmission and reception of information (i.e., channel, message) may be reduced due to a shortened TTI (i.e., short TTI) compared to the existing case. Accordingly, a method for efficiently transmitting and receiving information in a system supporting a short TTI needs to be taken into consideration.

Hereinafter, in this specification, a method of efficiently transmitting and receiving control information when a control channel (e.g., PUCCH, PDCCH) is configured (or constructed) based on a short TTI is described. Specifically, this specification proposes a channel coding method for efficiently transmitting and receiving control information.

Hereinafter, for convenience of description, in the case of a system supporting a long TTI and a channel in which a length has been lengthily configured, a downlink control channel is referred to as a physical downlink control channel (PDCCH), a downlink data channel (or downlink shared channel) is referred to as a physical downlink shared channel (PDSCH), an uplink control channel is referred to as a physical uplink control channel (PUCCH), and an uplink data channel (or uplink shared channel) is referred to as a physical uplink shared channel (PUSCH). For example, in this specification, a PUCCH may mean a long format PUCCH, long PUCCH or legacy PUCCH of an NR system.

In this case, a case where ACK/NACK feedback for downlink data transmission is transmitted through a PUCCH and ACK/NACK feedback for uplink data transmission is transmitted through a PDCCH or a physical hybrid ARQ indication channel (PHICH) is assumed.

Furthermore, in the case of a system supporting a short TTI and a channel in which a length has been shortly configured, each channel may be represented by adding "s" to the front part of a corresponding channel. In other words, in this case, a downlink control channel is referred to as an sPDCCH, a downlink data channel is referred to as sPDSCH, an uplink control channel is referred to as an sPUCCH, and an uplink data channel is referred to as an sPUSCH. For example, in this specification, the sPUCCH may mean a short format PUCCH or short PUCCH of an NR system.

As described above, in the case of a system in which a TTI has been shortly configured (i.e., system supporting a short TTI), the size of a container (e.g., channel) through which information is transmitted and received may be configured to be small as long as the length (or degree) of a shortened TTI compared to a system in which a TTI has been lengthily configured. That is, in the case of a system in which a TTI has been shortly configured, the amount of information that may be transmitted at once may be limited. Furthermore, a method of transmitting and receiving information robustly against a channel environment needs to be taken into consideration because a total energy size of transmitted and received information is limited.

Particularly, in the case of a control channel (e.g., sPUCCH, sPDCCH) through which control information is transmitted, in order to prevent a loss of the control information, a more robust transmission and reception method needs to be taken into consideration. For example, if an sPUCCH in a system in which a TTI has been shortly configured is taken into consideration, energy (i.e., transmission or reception energy) is reduced and the quantity of information is also reduced as many as symbols reduced compared to a legacy LTE system (i.e., system using a 14-symbol TTI). Accordingly, a method different from the transmission and reception of the existing PUCCH (i.e., PUCCH configured based on the 14-symbol TTI) needs to be taken into consideration.

For example, a user equipment may transmit uplink control information (e.g., HARQ-ACK information, SR) of a small size using a computer-generated sequence identically with the existing PUCCH. In this case, the user equipment may transmit the uplink control information using a method of transmitting a reference signal (RS) using only the sequence and multiplying the sequence by a modulated symbol (i.e., modulated uplink control information).

In contrast, in the case of uplink control information of a large size, the size of a container is reduced by the shortened TTI length of an sPUCCH. Accordingly, the size of transmittable information may be increased using a format (e.g., PUCCH format 4, 5 (of the legacy LTE system)) used for the transmission of a large amount of control information.

Furthermore, a user equipment may transmit uplink control information more robustly by applying channel coding according to the formats.

If a user equipment transmits uplink control information of a small size and uplink control information of a large size using different formats as described above, the complexity of a system may be increased. Accordingly, in terms of system complexity, a method of transmitting uplink control information of all sizes using a single format (i.e., single unified format) may be efficient.

For example, a method using the same format regardless of the type and/or size of information transmitted through an sPUCCH may be taken into consideration. Specifically, a user equipment may transmit uplink control information based on a format (e.g., PUCCH format 4, 5) used for the transmission of a large amount of control information.

sion, a user equipment may apply channel coding using an RM coding method instead of TBCC and adjust the number of bits to the size of a container. For example, in a TTI system of a 3-symbol length (i.e., system supporting a TTI of a 3-symbol length), a user equipment may use a sequence configured for RM coding in order to transmit 1-bit or 2-bit HARQ-ACK information in accordance with a format (e.g., PUCCH format 4) used for the transmission of a large amount of control information.

In other words, the user equipment may generate an coded bit (or encoded bit) of a size corresponding to the length of a sequence, configured for RM coding, by applying the corresponding sequence to uplink control information of a small size. Table 8 shows a length-32 sequence configured for RM coding.

TABLE 8

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 1 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 0 | 1 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Hereinafter, in this specification, a method of (robustly) transmitting and receiving all pieces of uplink control information using a single format (i.e., unified channel coding scheme) is described. Specifically, a method of transmitting uplink control information of a small size through a container of a large size is described.

In this case, a channel coding method configured differently from the existing PUCCH format (e.g., PUCCH format 4) depending on the property (e.g., constraint length) of an applied channel coding scheme needs to be taken into consideration. In this case, a user equipment may apply a single channel coding scheme (e.g., tail biting convolution coding (TBCC), Reed-Muller (RM) coding) to uplink control information.

First Embodiment—Method Using Reed-Muller (RM) Coding

First, in the case of 1-bit or 2-bit HARQ-ACK information (i.e., 1-bit or 2-bit ACK/NACK information) transmis- If the sequence shown in Table 8 is used, a user equipment may encode (or convert, change) 1-bit or 2-bit HARQ-ACK information into a coded bit of 32 bits. That is, the user equipment may generate a coded bit of 32 bits representing uplink control information by applying a length-32 sequence to the uplink control information configured as a 1-bit or 2-bit size.

In this case, if two symbols are allocated for the transmission of the uplink control information, the two symbols may carry 48-bit information based on quadrature phase shift keying (QPSK) modulation. That is, the two symbols may be a container carrying 48 bits. In this case, a user equipment may transmit a coded bit of 32 bits based on a 48-bit size by cyclically repeating the coded bit of 32 bits.

Second Embodiment—Method Using Tail Biting Convolution Coding (TBCC)

A method of transmitting uplink control information using TBCC instead of the above-described RM coding is described below. If a user equipment uses TBCC, a constraint length condition necessary for a TBCC method needs to be satisfied. In this case, the constraint length means a minimum number of bits necessary (i.e., required) to generate (or encode) a coded bit through TBCC.

Figure 10:
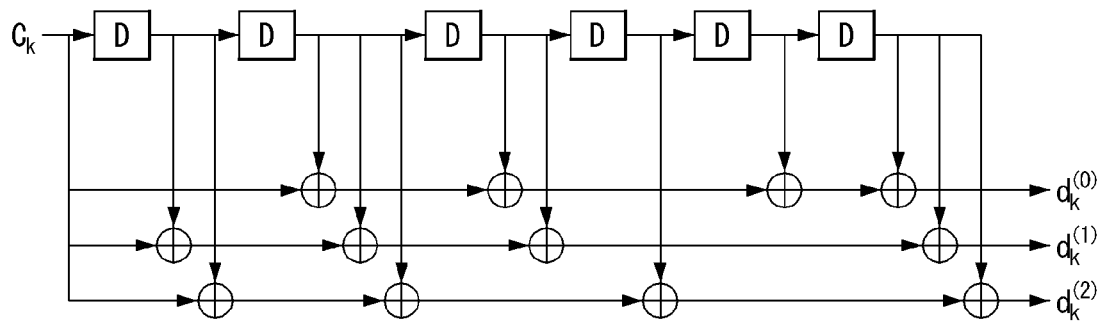
FIG. 10 shows an example of a tail biting convolution coding (TBCC) encoder to which a method proposed in this specification may be applied.

FIG. 10 shows an example of a tail biting convolution coding (TBCC) encoder to which a method proposed in this specification may be applied. FIG. 10 is merely for convenience of description and does not limit the scope of the present invention.

Referring to FIG. 10, the TBCC encoder may be configured with 6 shift register. Furthermore, a case where the coding rate of the corresponding TBCC encoder is configured as 1/3 is assumed.

In this case, if TBCC is applied to input information (e.g., uplink control information) $c_k(c_0, c_1, c_2, \ldots, c_{K-1})$, output information (i.e., coded bit) is present in each of 3 branches. Specifically, an output $d_k^{(0)}$ ($d_0^{(0)}, d_1^{(0)}, d_2^{(0)}, \ldots, d_{K-1}^{(0)}$) is present in the first branch, an output $d_k^{(1)}$ ($d_0^{(1)}, d_1^{(1)}, d_2^{(1)}, \ldots, d_{K-1}^{(1)}$) is present in the second branch, and an output $d_k^{(2)}$ ($d_0^{(2)}, d_1^{(2)}, d_2^{(2)}, \ldots, d_{K-1}^{(2)}$) is present in the third branch.

In this case, a constraint length (i.e., a minimum number of bits of a TBCC operation) may be configured as 7 because the 6 shift registers are present. In other words, the constraint length of the TBCC encoder may be determined depending on the number of shift registers.

Accordingly, if the size of uplink control information is small (e.g., 1 bit, 2 bits), methods for satisfying a constraint length (i.e., a minimum number of bits) necessary for TBCC needs to be taken into consideration. To this end, this specification proposes a method of adding a pre-configured bit(s) (i.e., known bit(s)) to a bit(s) representing uplink control information (hereinafter method 1) and a method of repeating a bit(s) representing uplink control information (hereinafter method 2). In this specification, the two methods are illustrated as being separately applied, but the two methods may be combined and applied.

(Method 1: Method of Adding Pre-Configured Bit to Bit to be Transmitted)

First, a method of adding a pre-configured bit to a bit to be transmitted (i.e., bit representing uplink control information, decoding result) is described.

For example, if the constraint length of a TBCC encoder is 7 and HARQ-ACK information is configured with 1 bit or 2 bits, a user equipment may perform TBCC encoding by adding pre-configured 6 bits or 5 bits after the corresponding 1 bit or 2 bits. A detailed example related to this is shown in FIG. 11.

Figure 11:
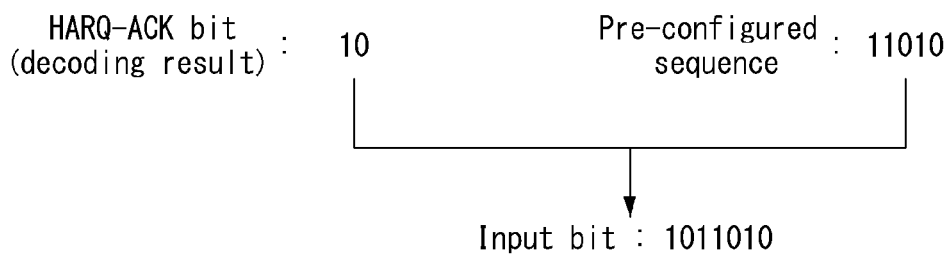
FIG. 11 shows an example of an input bit configuration method of a TBCC encoder to which a method proposed in this specification may be applied.

FIG. 11 shows an example of an input bit configuration method of a TBCC encoder to which a method proposed in this specification may be applied. FIG. 11 is merely for convenience of description and does not limit the scope of the present invention.

Referring to FIG. 11, a case where the constraint length of a TBCC encoder is configured as 7 is assumed.

In FIG. 11, HARQ-ACK information (i.e., decoding result) for information received by a user equipment from a base station is 2-bit information "10", and pre-configured bits (or pre-configured sequence) are "11010." In this case, the user equipment may generate input bits "1011010" by adding the pre-configured bits "11010" to the HARQ-ACK information "10."

Accordingly, the user equipment may perform a TBCC encoding operation on the corresponding input bits because the 7-bit information "1011010" satisfies the constraint length condition of the TBCC encoder.

(Method 2: Method of Repeating Bit to be Transmitted)

A method of satisfying the constraint length of TBCC encoding by repeating a bit(s) to be transmitted (i.e., bits representing uplink control information, decoding result) is described below.

For example, if the constraint length of a TBCC encoder is 7 and HARQ-ACK information is configured as 1 bit (e.g., "1"), a user equipment may satisfy the constraint length condition by repeating the corresponding 1 bit seven times. Alternatively, if the constraint length of a TBCC encoder is 7 and HARQ-ACK information is configured as 2 bits (e.g., "01"), a user equipment may satisfy the constraint length condition by repeating the corresponding 2 bits five times. In this case, the user equipment may repeat the HARQ-ACK information (i.e., decoding result) an odd number of times for decision making. That is, in order to satisfy the constraint length condition, the user equipment may generate an input bit for the TBCC encoder by repeating the decoding result an odd number of times. A detailed example related thereto is shown in FIG. 12.

Figure 12:
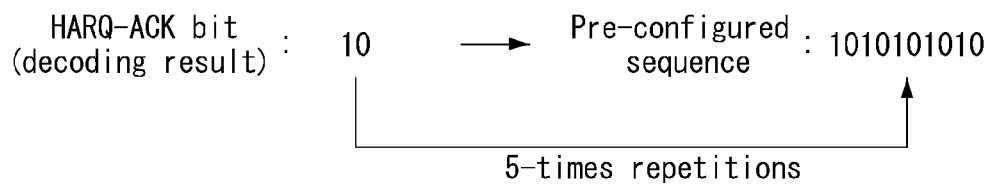
FIG. 12 shows another example of an input bit configuration method of a TBCC encoder to which a method proposed in this specification may be applied.

FIG. 12 shows another example of an input bit configuration method of a TBCC encoder to which a method proposed in this specification may be applied. FIG. 12 is merely for convenience of description and does not limit the scope of the present invention.

Referring to FIG. 12, a case where the constraint length of the TBCC encoder is configured as 7 is assumed.

In FIG. 12, HARQ-ACK information for information received by a user equipment from a base station 2-bit information "10." In this case, the user equipment may generate input bits "1010101010" of a length 10 by repeating the HARQ-ACK information "10" five times. Accordingly, the user equipment may perform a TBCC encoding operation on the corresponding input bits because the information "1010101010" of 10 bits satisfies the constraint length condition of the TBCC encoder.

In relation to the above-described methods (i.e., method 1 and method 2), the bit number of added pre-configured bits and/or the repetition number of decoding results may be configured (or constructed) in various ways. Furthermore, the bit number and the repetition number may be defined per system and may be changed according to situations (e.g., network situation, coverage). For example, if the number of bits of HARQ-ACK information is "X" bits or less, a user equipment may add a pre-configured bit(s) to the HARQ-ACK information or repeat the HARQ-ACK information itself so that a total number of bits of input bits of the TBCC encoder satisfies "X."

Furthermore, in relation to the above-described methods, if polar coding is applied instead of TBCC, a constraint length condition may be configured (or defined) as $2^n$. In this case, n may mean a positive integer. For example, if n is 3, a minimum size (i.e., a minimum number of bits) for using polar coding may be 8 ($2^3=8$).

Furthermore, in various embodiments of the present invention, the above-described methods may also be applied to a multiple HARQ-ACK operation.

If the number of bits of multiple HARQ-ACK information satisfies a constraint length condition configured in a TBCC encoder (e.g., if multiple HARQ-ACK information is 10-bit information configured with 2-bit HARQ-ACK information for each of 5 cells), TBCC encoding may be performed using the multiple HARQ-ACK information without any change. In contrast, if the number of bits of multiple HARQ-ACK information does not satisfy a constraint length condition configured in a TBCC encoder (i.e., if the number of bits of multiple HARQ-ACK information is smaller than a constraint length), the above-described methods may be applied.

For example, the RM coding scheme may be applied to multiple HARQ-ACK information. Alternatively, as in the method 1, a user equipment may satisfy a constraint length condition by adding a pre-configured bit to the multiple HARQ-ACK information. Alternatively, as in the method 2, a user equipment may satisfy a constraint length condition by repeating multiple HARQ-ACK information. In this case, as described above, the bit number of an added pre-configured bit and/or the repetition number of decoding result may be configured (or constructed) in various ways, may be defined per system, or may be differently configured according to situations. Furthermore, in this case, a user equipment may repeat a plurality of pieces of HARQ-ACK information an odd number of times for decision making.

Furthermore, the above-described various embodiments (or methods) of the present invention are not limited to the HARQ-ACK procedure, and may be used to differently configure an applied coder and/or information bit based on the number of bits that enter one container (i.e., the number of bits delivered through one container).

For example, a user equipment may be configured to use TBCC or polar coding if a bit number (e.g., HARQ-ACK information bit number) is greater than a minimum encodable size and to use the RM coding or repetition coding scheme if not. In other words, the type of a coder to be used by a user equipment may be differently configured depending on whether a bit number satisfies a constraint condition (e.g., constraint length) configured for the coder. Alternatively, the above-described methods may mean methods which apply padding or repetition to the same coding scheme.

In this case, as described above, the coding scheme may be implicitly configured based on a bit number, but a network may designate a coding scheme to be used by a user equipment. Alternatively, a coding scheme to be used by a user equipment may be differently configured depending on the content of information to be transmitted. For example, if information to be transmitted is configured with HARQ-ACK information, a user equipment may be configured to use the RM coding or repetition coding scheme regardless of a bit number. Alternatively, if information to be transmitted is configured with CSI information, a user equipment may be configured to use the TBCC or polar coding scheme.

Figure 13:
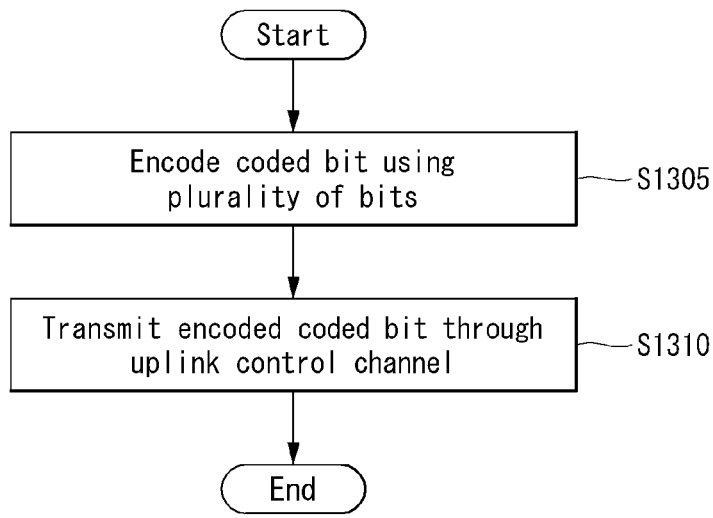
FIG. 13 shows an operational flowchart of a user equipment performing uplink transmission using tail biting convolution coding (TBCC) to which a method proposed in this specification may be applied.

FIG. 13 shows an operational flowchart of a user equipment performing uplink transmission using tail biting convolution coding (TBCC) to which a method proposed in this specification may be applied. FIG. 13 is merely for convenience of description and does not limit the scope of the present invention.

Referring to FIG. 13, a case where a user equipment encodes uplink control information (e.g., HARQ-ACK information, SR, CSI) using a TBCC scheme.

At step S1305, the user equipment encodes a coded bit (or encoded bit, codeword) using a plurality of bits. In this case, the plurality of bits is generated by repeating at least one bit corresponding to uplink control information an odd number of times. Furthermore, the bit number of the plurality of bits is configured to be equal to or greater than a pre-configured threshold value (e.g., constraint length) for the TBCC. In this case, a method of encoding the coded bit and a method of generating the plurality of bits may be performed like the above-described methods.

Thereafter, at step S1310, the user equipment transmits the encoded coded bit to a base station through an uplink control channel (e.g., PUCCH).

In this case, the uplink control channel may be configured based on a short transmission time interval (short TTI) as described above.

Furthermore, the user equipment may receive downlink data from the base station. In this case, the uplink control information may include HARQ-ACK information for the received downlink data. In this case, the HARQ-ACK information may be configured in a 1-bit or 2-bit bitmap form (e.g., "1" or "01").

Furthermore, as described above, the user equipment may receive a plurality of downlink data from a plurality of base stations (i.e., from a plurality of cells) including the base station. In this case, the uplink control information may include multiple HARQ-ACK information for the plurality of downlink data. Furthermore, the multiple HARQ-ACK information may be configured as a smaller number of bits than the pre-configured threshold value. Furthermore, as described above, the multiple HARQ-ACK information may be configured based on (or according to) at least one of ACK/NACK multiplexing or ACK/NACK bundling.

Furthermore, as described in FIG. 10, the pre-configured threshold value may be configured based on the number of shift registers included in an encoder for the TBCC. Specifically, the pre-configured threshold value may be configured as a value obtained by adding 1 to the number of shift registers. For example, if a TBCC encoder is configured with 6 shift registers, the constraint length of the TBCC encoder may be configured as 7.

Overview of Apparatus to which the Present Invention May be Applied

Figure 14:
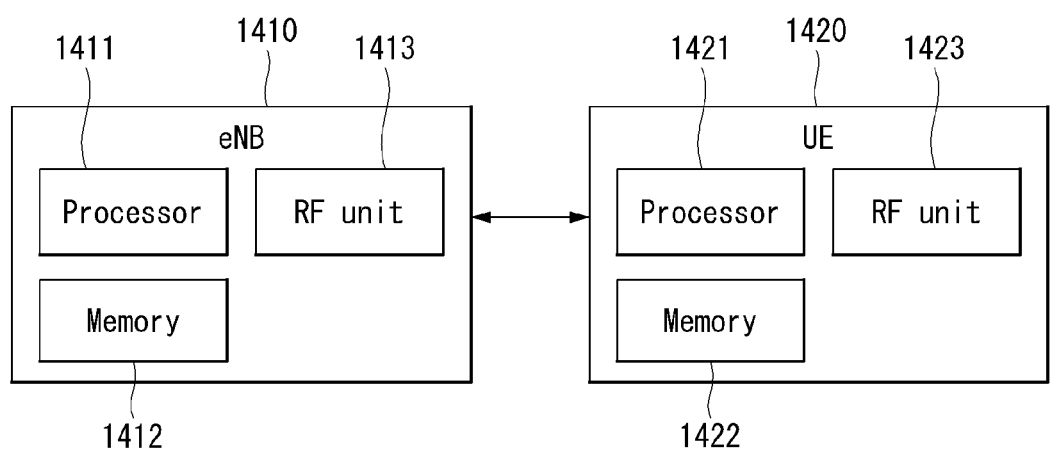
FIG. 14 illustrates a block diagram of a wireless communication apparatus to which methods proposed in this specification may be applied.

FIG. 14 illustrates a block diagram of a wireless communication apparatus to which methods proposed in this specification may be applied.

Referring to FIG. 14, a wireless communication system includes an eNB 1410 and a plurality of user equipments 1420 disposed within the area of the eNB 1410.

The eNB 1410 includes a processor 1411, memory 1412 and a radio frequency (RF) unit 1413. The processor 1411 implements the functions, processes and/or methods proposed in FIGS. 1 to 13. The layers of a radio interface protocol may be implemented by the processor 1411. The memory 1412 is connected to the processor 1411 and stores a variety of pieces of information for driving the processor 1411. The RF unit 1413 is connected to the processor 1411 and transmits and/or receives a radio signal.

The user equipment 1420 includes a processor 1421, memory 1422 and an RF unit 1423.

The processor 1421 implements the functions, processes and/or methods proposed in FIGS. 1 to 13. The layers of a radio interface protocol may be implemented by the processor 1421. The memory 1422 is connected to the processor 1421 and stores a variety of pieces of information for driving the processor 1421. The RF unit 1423 is connected to the processor 1421 and transmits and/or receives a radio signal.

The memory 1412, 1422 may be positioned inside or outside the processor 1411, 1421 and may be connected to the processor 1411, 1421 by various well-known means.

For example, in a wireless communication system supporting low latency service, a user equipment may include a radio frequency (RF) unit for transmitting and receiving radio signals in order to transmit and receive downlink data (DL data) and a processor functionally connected to the RF unit.

Furthermore, the eNB 1410 and/or the user equipment 1420 may have a single antenna or multiple antennas.

Figure 15:
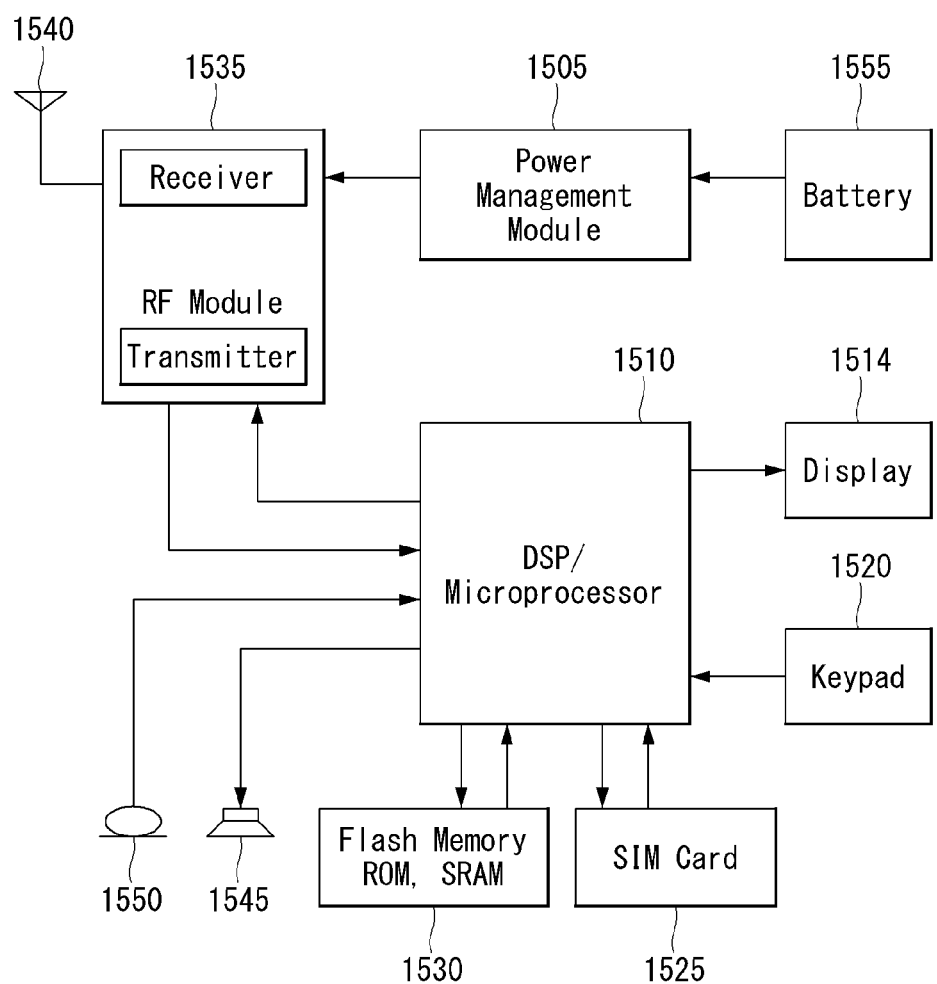
FIG. 15 illustrates a block diagram of a communication apparatus according to an embodiment of the present invention.

FIG. 15 illustrates a block diagram of a communication apparatus according to an embodiment of the present invention.

Particularly, FIG. 15 is a diagram specifically illustrating the user equipment of FIG. 14.

Referring to FIG. 15, the UE may include a processor (or digital signal processor (DSP)) 1510, an RF module (or RF unit) 1535, a power management module 1505, an antenna 1540, a battery 1555, a display 1515, a keypad 1520, a memory 1530, a subscriber identification module (SIM) card 1525 (this element is optional), a speaker 1545, and a microphone 1550. The UE may further include a single antenna or multiple antennas.

The processor 1510 implements the functions, processes and/or methods proposed in FIGS. 1 to 13. The layers of a radio interface protocol may be implemented by the processor.

The memory 1530 is connected to the processor 1510, and stores information related to the operation of the processor 1510. The memory may be positioned inside or outside the processor 1510 and may be connected to the processor 1510 by various well-known means.

A user inputs command information, such as a telephone number, by pressing (or touching) a button of the keypad 1520 or through voice activation using the microphone 1550, for example. The processor receives such command information and performs processing so that a proper function, such as making a phone call to the telephone number, is performed. Operational data may be extracted from the SIM card 1525 or the memory. Furthermore, the processor 1510 may recognize and display command information or driving information on the display 1515, for convenience sake.

The RF module 1535 is connected to the processor 1510 and transmits and/or receives RF signals. The processor delivers command information to the RF module 1535 so that the RF module 1535 transmits a radio signal that forms voice communication data, for example, in order to initiate communication. The RF module 1535 includes a receiver and a transmitter in order to receive and transmit radio signals. The antenna 1540 functions to transmit and receive radio signals. When a radio signal is received, the RF module 1535 delivers the radio signal so that it is processed by the processor 1510, and may convert the signal into a baseband. The processed signal may be converted into audible or readable information output through the speaker 1545.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method performing uplink transmission in a wireless communication system of the present invention has been illustrated as being applied to the 3GPP LTE/LTE-A system, 5G system (New RAT system), but may be applied to various wireless communication systems in addition to the systems.

The invention claimed is:

1. A method of performing uplink transmission using tail biting convolution coding (TBCC) by a user equipment in a wireless communication system, the method comprising:
    encoding a coded bit using a plurality of bits, and
    transmitting, to a base station, the encoded coded bit through an uplink control channel,
    wherein the plurality of bits is generated by repeating at least one bit, corresponding to uplink control information, by an odd number of times based on that the number of bits of the at least one bit is smaller than a pre-configured threshold value for the TBCC, and
    wherein the repeating the at least one bit is performed until the number of bits of the plurality of bits is configured to be equal to or greater than the pre-configured threshold value for the TBCC.

2. The method of claim 1, wherein the uplink control channel is configured based on a short transmission time interval.

3. The method of claim 1, further comprising:
    receiving downlink data from the base station,
    wherein the uplink control information includes HARQ-ACK information for the received downlink data.

4. The method of claim 3, wherein the HARQ-ACK information is configured in a bitmap form of 1 bit or 2 bits.

5. The method of claim 1, further comprising:
    receiving a plurality of downlink data from a plurality of base stations including the base station,
    wherein the uplink control information includes multiple HARQ-ACK information for the plurality of downlink data.

6. The method of claim 5, wherein the multiple HARQ-ACK information is configured as a smaller number of bits than the pre-configured threshold value.

7. The method of claim 5, wherein the multiple HARQ-ACK information is configured based on at least one of ACK/NACK multiplexing or ACK/NACK bundling.

8. The method of claim 1, wherein the pre-configured threshold value is configured based on a number of shift registers included in an encoder for the TBCC.

9. The method of claim 8, wherein the pre-configured threshold value is configured as a value obtained by adding 1 to the number of shift registers.

10. A user equipment performing uplink transmission using tail biting convolution coding (TBCC) in a wireless communication system, the user equipment comprising:
   a radio frequency (RF) unit configured to transmit and receive radio signals, and
   a processor functionally connected to the RF unit,
   wherein the processor is configured to:
      encode a coded bit using a plurality of bits, and
      transmit, to a base station, the encoded coded bit through an uplink control channel,
      wherein the plurality of bits is generated by repeating at least one bit, corresponding to uplink control information, by an odd number of times based on that the number of bits of the at least one bit is smaller than a pre-configured threshold value for the TBCC, and
      wherein the repeating the at least one bit is performed until the number of bits of the plurality of bits is configured to be equal to or greater than the pre-configured threshold value for the TBCC.

11. The user equipment of claim 10, wherein the uplink control channel is configured based on a short transmission time interval.

12. The user equipment of claim 10, wherein the processor is configured to receive downlink data from the base station, and
   wherein the uplink control information includes HARQ-ACK information for the received downlink data.

13. The user equipment of claim 12, wherein the HARQ-ACK information is configured in a bitmap form of 1 bit or 2 bits.

14. The user equipment of claim 10, wherein the processor is configured to receive a plurality of downlink data from a plurality of base stations including the base station, and
   wherein the uplink control information includes multiple HARQ-ACK information for the plurality of downlink data.

15. The user equipment of claim 10, wherein the pre-configured threshold value is configured based on a number of shift registers included in an encoder for the TBCC.

* * * * *